Oct. 10, 1961 J. H. GORDLEY 3,003,319

HYDRAULIC ACTUATING SYSTEM

Filed Oct. 28, 1959 2 Sheets-Sheet 1

INVENTOR.
Jerry H. Gordley
BY D. C. Staley
His Attorney

Oct. 10, 1961 J. H. GORDLEY 3,003,319

HYDRAULIC ACTUATING SYSTEM

Filed Oct. 28, 1959 2 Sheets-Sheet 2

INVENTOR.
Jerry H. Gordley

BY
D. C. Staley
His Attorney

United States Patent Office 3,003,319
Patented Oct. 10, 1961

3,003,319
HYDRAULIC ACTUATING SYSTEM
Jerry H. Gordley, Brookville, Ohio, assignor to General Motors Corporation, Detroit, Mich., a corporation of Delaware
Filed Oct. 28, 1959, Ser. No. 849,300
6 Claims. (Cl. 60—54.6)

This invention relates to a hydraulic actuating system for use on a motor vehicle and particularly to a system adapted for operating the hydraulic brakes on the vehicle as well as a second hydraulic component on the vehicle, such as the clutch. One of the problems of maintenance of hydraulic systems on motor vehicles is insurance of sufficient volume of hydraulic fluid in the brake system for positive brake operation of the vehicle. Conventionally, the hydraulic brake on a motor vehicle is a self-contained system in that it includes a storage container for hydraulic fluid that supplies fluid to the master cylinder and to the brake lines and wheel cylinders of the hydraulic brake system to maintain the system completely full of fluid at all times. In the conventional system the storage container is in fluid connection with the master cylinder of the hydraulic brake system so that whenever the master cylinder piston is in retracted position, upon release of the brakes, hydraulic fluid from the storage reservoir can flow freely by gravity to the master cylinder to make up for any loss of fluid occurring from the hydraulic system resulting from leaks in the system. Ultimately, if the hydraulic system leaks, the fluid in the storage container is depleted so that additional stroking of the master cylinder results in loss of fluid from the master cylinder without possibility of make-up so that the brake system becomes ineffective. This can occur without warning to the operator of the vehicle.

Since it is also conventional on motor vehicles, particularly on truck installations, to have other hydraulically operated components, and in particular hydraulically operated clutch mechanisms, it is an object of this invention to interconnect the hydraulic system for the auxiliary components on the motor vehicle with the brake system in such a manner that fluid loss from the hydraulic system will ultimately show up as a failure of proper operation of the auxiliary hydraulic component so that the operator of the vehicle is given a warning that the hydraulic system is losing fluid and should be inspected before complete loss of fluid has occurred such as will result in ineffective operation of the hydraulic brake system.

It is another object of the invention to provide a hydraulic system for operating the brakes of a vehicle and also a second hydraulically operated component on the vehicle wherein hydraulic fluid is adapted to be delivered from the second hydraulically operated component into the brake system so that loss of hydraulic fluid from either the hydraulic brake system or that for the auxiliary component will result in failure of the auxiliary component before the hydraulic fluid from the brake system is completely depleted to give warning to the operator of the vehicle to the condition of the fluid loss of the system and to insure brake operation for a time period after the hydraulic fluid has been lost from the system for the auxiliary or second hydraulic component.

More specifically, it is an object of the invention to provide a hydraulic system for operating the brakes of a vehicle that includes a master cylinder and piston assembly in fluid connection with a storage container from which the master cylinder receives hydraulic fluid for make-up of loss of fluid in the hydraulic brake system in the event of loss of fluid from the system and which includes a second hydraulic cylinder and piston assembly for operating a second hydraulic component on the vehicle, such as the clutch of the vehicle, with the second cylinder and piston assembly being in fluid connection with the storage container or reservoir for the hydraulic brake system in a manner to receive fluid from the storage container for make-up of hydraulic fluid in the event fluid is lost from the hydraulic system which includes the second cylinder and piston assembly. The arrangement is such that so long as the hydraulic fluid in the storage container is above a predetermined low depletion level, the cylinders for both the brake system and the clutch system can receive make-up fluid from the main storage supply in the storage container. However, the second cylinder and piston assembly for the auxiliary component is arranged such that hydraulic fluid is delivered from the second hydraulic cylinder and piston assembly into a sump chamber for the master cylinder of the brake system so that whenever the hydraulic fluid in the storage container reaches the predetermined low depletion level, hydraulic fluid will be delivered from the auxiliary hydraulic cylinder and piston assembly into the sump chamber for the master cylinder with the result the auxiliary hydraulic component will operate improperly because of loss of hydraulic fluid from the system to give warning to the operator of the vehicle that hydraulic fluid is being lost, and at the same time insure continued proper operation of the hydraulic brake system for a short time period after the warning is given to the operator.

Further objects and advantages of the present invention will be apparent from the following description, reference being had to the accompanying drawings wherein preferred embodiments of the present invention are clearly shown.

Figures 1, 2, 5:
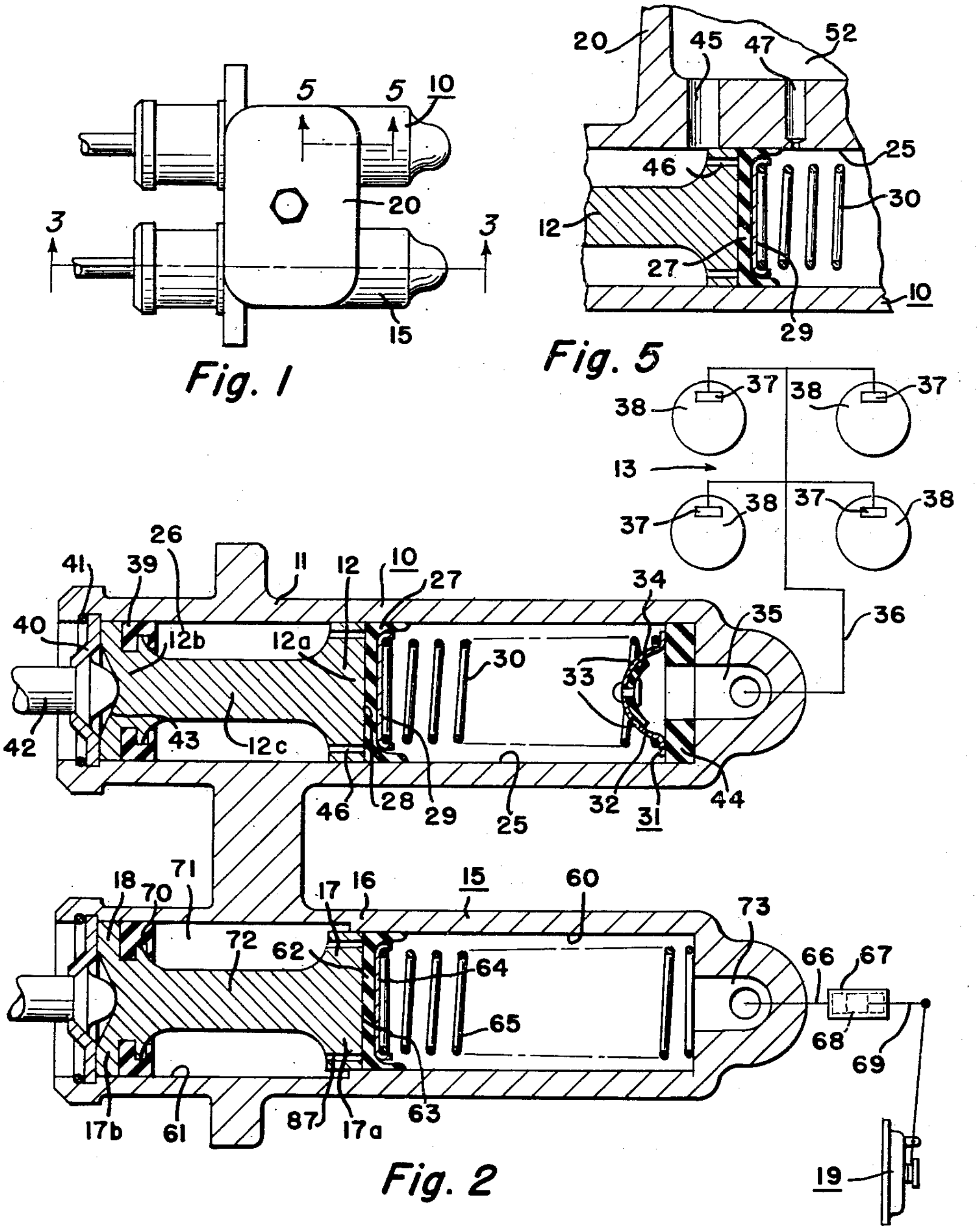
FIG. 1 is a plan view of a dual hydraulic cylinder and piston assembly incorporating features of this invention.
FIG. 2 is a transverse cross-sectional view taken along line 2—2 of FIG. 4 illustrating a master cylinder and piston assembly for operating hydraulic brakes and a second or auxiliary cylinder and piston assembly for operating a second hydraulic component such as a hydraulically operated clutch mechanism.
FIG. 5 is a partial cross-sectional view of the master cylinder for the brake system taken substantially along line 5—5 of FIG. 1.

In this invention a master cylinder and piston assembly 10 consisting of the master cylinder 11 and the master cylinder piston 12 is provided for operating a hydraulic brake system 13. A second or auxiliary cylinder and piston assembly 15 consisting of the cylinder 16 and the piston elements 17 and 18 is adapted to operate a hydraulically operated clutch mechanism 19.

The master cylinder and piston assembly 10 and the auxiliary cylinder and piston assembly 15 are integrally cast with a storage container or reservoir 20 containing a body of hydraulic fluid 21 provided for supply to the master cylinder and piston assembly 10, as well as the auxiliary cylinder and piston assembly 15. The storage container 20 is provided with a cover member 22 secured in position by a retaining bolt 23.

The master cylinder and piston assembly 10 that includes the cylinder 11 has a cylinder bore 25 that receives the master cylinder piston 12 for reciprocation therein. The master cylinder piston 12 consists of a forward piston portion 12a and a rearward piston portion 12b interconnected by a stem portion 12c thereby forming an annular chamber 26 between the piston portions 12a and 12b.

The forward end piston portion 12a of the master cylinder piston 12 has a cup seal 27 disposed against the forward face 28 of the piston 12 with a cup-shaped multiple finger lip expander positioned within the cup seal 27 and retained thereagainst by a compression spring 30 disposed between the expander 29 and a residual pressure check valve at the forward end of the cylinder 11. The residual pressure check valve 31 consists of a cup-shaped element 32 having a plurality of holes 33 therein normally closed by a flap valve 34 that allows hydraulic fluid to flow in a right-hand direction into the discharge port 35 for delivery into the hydraulic line 36 that connects with the wheel cylinders 37 of the hydraulically actuated brakes 38. The cup-shaped member 32 seats upon a rubber washer member 44 by means of the compression spring 30. The member 32 is adapted to be lifted from the seat member 44 during the retraction stroke of the master cylinder piston 12, the hydraulic fluid under pressure in the hydraulic line 36 causing the member 32 to lift from the seat 44 for return of fluid to the master cylinder bore 25.

The end portion 12b of the master cylinder piston 12 has a seal element 39 to close the chamber 26. A stop member 40 is placed in the left-hand end of the master cylinder bore 25 for positioning of the master cylinder piston under full retraction stroke as urged against the stop by the spring 30. The stop 40 is retained in position by a snap ring 41. A manually operated rod member 42 engages a recess 43 in the left-hand end of the master cylinder 12 to effect forward or right-hand movement of the piston 12 upon operation of the brake pedal of the vehicle by the operator.

The master cylinder bore 25 is in fluid communication with the reservoir chamber 20 by means of a compensating port 45 that connects with the chamber 26, as shown in FIG. 5. A plurality of axially extending ports 46 are provided in the master cylinder piston portion 12a so that during a retraction stroke, or leftward movement of the piston 12, hydraulic fluid can flow from the chamber 26 through the ports 46 and around the periphery of the cup seal 27 into the master cylinder bore on the right-hand side of the piston portion 12a to prevent cavitation in the master cylinder bore in the event of a rapid retraction stroke.

A second port 47 is provided between the reservoir chamber 20 and the master cylinder bore 25 just beyond the right-hand edge of the lip of the cup seal 27 which either allows excess fluid to be returned to the reservoir chamber 20 at the end of the retraction stroke, or provides for final compensation of the filling of the master cylinder bore to the right-hand side of the cup seal when the master cylinder piston 12 is in the position illustrated in FIGS. 2 and 5.

Figure 4:
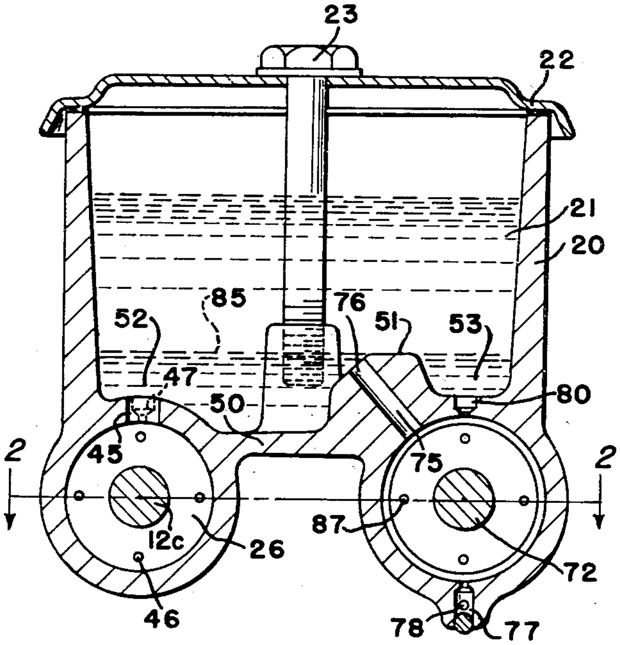
FIG. 4 is a vertical cross-sectional view taken substantially along line 4—4 of FIG. 3.

The storage container, or reservoir 20, has the bottom wall 50 thereof provided with a vertically positioned dam 51 that divides the lower portion of the reservoir chamber into separate sump chambers 52 and 53. The sump chamber 52 is in fluid communication with the master cylinder bore 25 through the ports 45 and 47 continually, as shown in FIGS. 4 and 5. Thus, so long as any hydraulic fluid is in the sump chamber 52, the master cylinder will receive make-up hydraulic fluid to retain the brake system filled with hydraulic fluid and thereby retain the brake system in proper operating condition.

The auxiliary or second hydraulic cylinder and piston assembly 15 consists of a cylinder bore 60 in which the piston element 17a is adapted to reciprocate and a second coaxial bore of somewhat larger diameter 61 in which the piston element 17b is adapted to reciprocate. The piston element 17a has a cup seal 62 positioned against the forward face 63 thereof. A cup-shaped multiple finger lip expander 64 is placed within the cup seal 62 and is retained in position by the compression spring 65. Forward or rightward movement of the piston 17 displaces hydraulic fluid from the cylinder bore 60 through the discharge port 73 into the hydraulic line 66 that supplies a hydraulic slave cylinder 67 with fluid under pressure to operate the piston 68 therein, which, in turn, operates the actuating arm 69 of the hydraulically operated clutch 19. The clutch 19 may be of conventional design.

The piston element 17b of the auxiliary piston 17 has a seal member 70 which closes the chamber 71 provided annularly around the stem 72 that interconnects the piston elements 17a and 17b.

Figure 3:
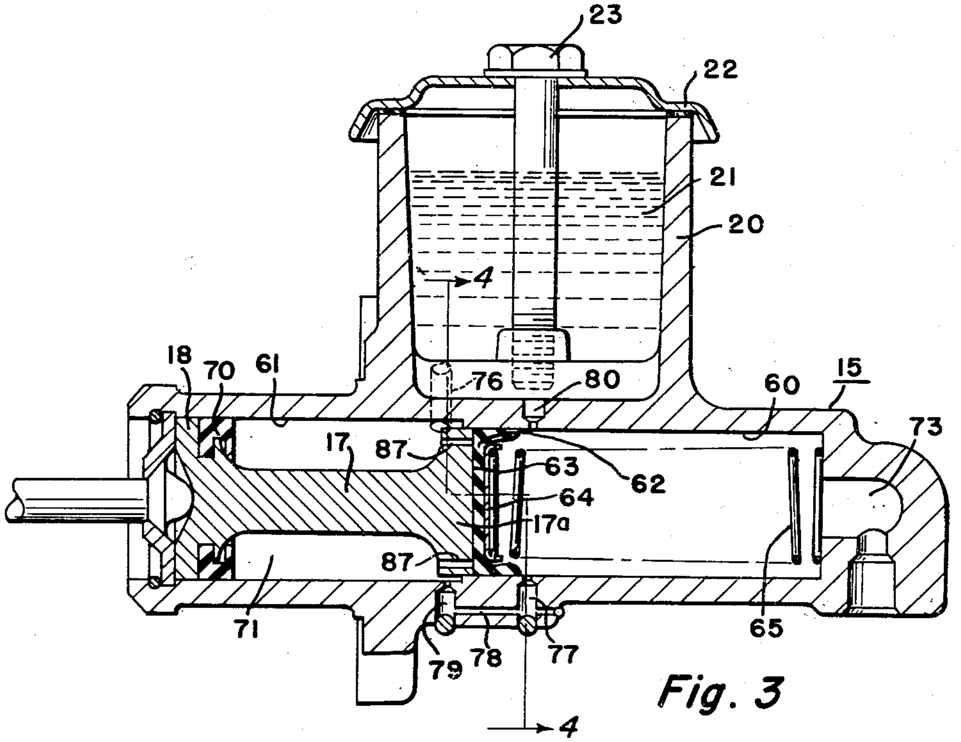
FIG. 3 is a vertical cross-sectional view taken along lines 3—3 of FIG. 1 illustrating the auxiliary cylinder and piston assembly.

As more particularly shown in FIGS. 3 and 4, the chamber 71 of the auxiliary piston and cylinder assembly is in fluid connection with the storage container 20 through the port passage 75 that has its terminus end 76 disposed adjacent the top wall of the dam 51 and on the side thereof to discharge into the sump chamber 52 for the master cylinder 10.

The auxiliary cylinder 15 also has a port 77 at the bottom center thereof, as shown in FIG. 4, connected by a passage 78 with a port 79 that connects with the chamber 71, as shown in FIG. 3, thereby interconnecting the bore 60 on the right-hand side of piston element 17a with the bore 62 on the left-hand side thereof when the piston 17 is in the retracted position, as shown in FIG. 3, to allow free flow of hydraulic fluid from chamber 60 into chamber 62. A compensating port 80 is provided in the bottom wall of the sump chamber 53 to allow for complete filling of the cylinder bore 60 when the piston is in the full retracted position shown in FIG. 3.

So long as the hydraulic fluid level is above a predetermined low depletion level established by the top edge of the dam 51, as indicated by the dotted line 85, the auxiliary cylinder and piston assembly receives fluid from the main supply 21 in the reservoir or storage container 20 through the passage 75 and through the compensating port 80 in the same manner that the master cylinder 10 receives its supply of hydraulic fluid from the reservoir through the port 45 and the compensating port 47.

Under normal conditions of operation, with the hydraulic fluid level in the storage container normally maintained above the predetermined low depletion level, the hydraulic fluid discharged from the chamber 26 of the master cylinder 10 and from the chamber 71 of the auxiliary cylinder 15 on rightward movement of either the master cylinder piston 12 or the auxiliary piston 17 will be delivered into the main supply of hydraulic fluid in the chamber 20. Also, make-up of any hydraulic fluid lost either from the hydraulic brake system 36 or from the hydraulic clutch system 66 will be in the manner heretofore described with regard to the master cylinder 10, the auxiliary cylinder 15 also being supplied with hydraulic fluid into the chamber 60 through the ports 87 in the piston element 17a. At this time the by-pass passage consisting of the ports 77 and 79 and the passage 78 perform no particular function.

However, should a leak develop in the hydraulic brake system 36 with continued loss of hydraulic fluid until the fluid level in the reservoir chamber 20 reaches the predetermined low depletion level 85, the top edge of the dam 51 separates the hydraulic fluid in the chamber 20 into two portions, one in the sump chamber 52 and another in the sump chamber 53. With continued leaking of hydraulic fluid from the brake system, the liquid level in the sump chamber 52 will fall until the level is below the top edge of the port 75 thereby cutting off completely any possibility of removal of hydraulic fluid from the sump 52 into the auxiliar cylinder 15.

When this occurs, the first movement of the auxiliary piston 17 in a right-hand direction to obtain a clutch operation will cause all hydraulic fluid in the cylinder bore 62 to be discharged through the port 75 into the sump chamber 52 for the master cylinder 10 thereby providing a reserve volume of hydraulic fluid in the master cylinder sump chamber 52 for use in the brake system 36, although it is still leaking.

As soon as the operator of the vehicle releases the clutch pedal after this just-mentioned clutch operation, return of the auxiliary piston 17 to the position shown in FIG. 3 will allow hydraulic fluid in the cylinder bore 60 of the auxiliary cylinder 15 to by-pass the piston element 17 and flow into the then empty chamber 71. This can occur until the sump chamber 53 is depleted of its fluid supply and a part of the fluid supply in cylinder bore 60 is delivered into the chamber 71. On the next clutch operation, the operator of the vehicle should feel a "spongy" or "soft" clutch action, possibly wih improper clutch operation, because the hydraulic system for operating the clutch will not be completely filled with hydraulic fluid, the hydraulic fluid having been lost to the chamber 71. During this second clutch operation, the hydraulic fluid is again delivered into the sump chamber 52 for the master cylinder 10 to insure continued maintenance of hydraulic fluid in the sump chamber 52 for delivery to the master cylinder to maintain proper brake action, even though the brake system is continuing to leak fluid. When the operator of the vehicle releases the clutch after this second clutch operation any fluid that remains in the cylinder bore 60 of the auxiliary cylinder will tend to seek its own level in the chamber 71 through the by-pass passage 77, 78, 79. The next clutch operation by the operator of the vehicle should definitely produce an ineffective clutch operation. The two improper and at least one ineffective clutch operations will give the operator of the vehicle warning that hydraulic fluid is being lost from the system and an immediate inspection should be made. However, from the foregoing description, it will be obvious that the hydraulic brake system will continue to function properly even though it has been the cause of loss of hydraulic fluid, and will continue to operate for a short time period until the hydraulic fluid in the sump chamber 52 is fully depleted. However, the warning given to the operator of the vehicle by failure of the auxiliary or second hydraulically operated component should produce an inspection of the hydraulic system before the brake system fails completely.

While the embodiments of the present invention as herein disclosed constitute a preferred form, it is to be understood that other forms might be adopted.

What is claimed is as follows:

1. A hydraulic actuating system for a motor vehicle, including, a first hydraulic system for operating the brakes of the vehicle and a second hydraulic system for operating a second component of the vehicle, a storage container for hydraulic fluid having a main fluid supply chamber and separate first and second sump chambers in fluid connection with said main chamber, a master cylinder and piston assembly in said first hydraulic system in fluid connection with one of said sump chambers to receive fluid therefrom, a second hydraulic cylinder and piston assembly in said second hydraulic system in fluid connection with the other of the sump chambers to receive fluid therefrom, auxiliary cylinder and piston means forming liquid displacement means having the piston thereof operably connected with the piston of said second assembly, means forming passage means connecting said auxiliary cylinder with said one sump chamber for displacement of fluid from the said auxiliary cylinder into the said one sump chamber, and means forming fluid connecting passage means between said second cylinder and said auxiliary cylinder to supply fluid to said auxiliary cylinder from said second cylinder to effect depletion of fluid in said second cylinder and the sump chamber connected therewith and deliver the so supplied fluid to said master cylinder sump chamber through said first mentioned passage forming means to maintain thereby fluid supply to said first system at the expense of depletion of fluid from said second system to warn thereby the operator of the vehicle of hydraulic fluid loss from the hydraulic system.

2. A hydraulic actuating system for a motor vehicle, including, a first hydraulic system for operating the brakes of the vehicle and a second hydraulic system for operating a second component of the vehicle, a storage container for hydraulic fluid having a main fluid supply chamber and separate first and second sump chambers in fluid connection with said main chamber, a master cylinder and piston assembly in said first hydraulic system in fluid connection with one of said sump chambers to receive fluid therefrom, a second hydraulic cylinder and piston assembly in said second hydraulic system in fluid connection with the other of the sump chambers to receive fluid therefrom, auxiliary cylinder and piston means forming liquid displacement means operable with said second assembly, means forming passage means connecting said auxiliary cylinder with said one sump chamber for displacement of fluid from the said auxiliary cylinder into the said one sump chamber with the discharge end of the said passage means disposed substantially above the bottom level of the said one sump chamber, and means forming fluid connecting passage means betwen said second cylinder and said auxiliary cylinder to supply fluid to said auxiliary cylinder from said second cylinder to effect depletion of fluid in said second cylinder and the sump chamber connected therewith and deliver the so supplied fluid to said master cylinder sump chamber through said first mentioned passage forming means to maintain thereby fluid supply to said first system at the expense of depletion of fluid from said second system to warn thereby the operator of the vehicle of hydraulic fluid loss from the hydraulic system.

3. A hydraulic actuating system for a motor vehicle, including, a first hydraulic system for operating the brakes of the vehicle and a second hydraulic system for operating a second component of the vehicle, a storage container for hydraulic fluid forming a main fluid supply and including wall means in the container forming separate sump chambers in the container, said wall means having a height substantially below a normally maintained hydraulic liquid level in the container but which is above a depletion level of hydraulic fluid from said sump chambers whereby said sump chambers are in fluid communication through the main body of liquid in the container above the level of said wall means until a predetermined low level of hydraulic fluid is reached in the container at the level of said wall means at which the fluid in the said sump chambers becomes separated by the said wall means, a master cylinder and piston assembly in said first hydraulic system in fluid connection with one of said sump chambers to receive fluid therefrom, a second hydraulic cylinder and piston assembly in said second hydraulic system in fluid connection with the other of the sump chambers to receive fluid therefrom, auxiliary cylinder and piston means forming liquid displacement means having the piston thereof operably connected with the piston of said second assembly, means forming passage means connecting said auxiliary cylinder with said one sump chamber for displacement of fluid from the said auxiliary cylinder into the said one sump chamber, and means forming fluid connecting passage means between said second cylinder and said auxiliary cylinder to supply fluid to said auxiliary cylinder from said second cylinder to effect depletion of fluid in said second cylinder and the sump chamber connected therewith and deliver the so supplied fluid to said master cylinder sump chamber through said first mentioned passage forming means to maintain thereby fluid supply to said first system at the expense of depletion of fluid from said second system to warn thereby the operator of the vehicle of hydraulic fluid loss from the hydraulic system.

4. A hydraulic actuating system for a motor vehicle, including, a first hydraulic system for operating the brakes of the vehicle and a second hydraulic system for operating a second component of the vehicle, a storage container for hydraulic fluid having a main fluid supply chamber and separate first and second sump chambers in fluid connection with said main chamber, a master cylinder and piston asembly in said first system in fluid connection with one of said sump chambers to receive fluid therefrom, a second hydraulic cylinder in said second system having a first piston member operable therein to effect operation of said second component and a second piston member axially spaced from the first piston member and movable therewith to effect thereby liquid displacement from the second cylinder betwen the said two piston members on concurrent movement thereof, said second hydraulic cylinder having a first passage means fluid connecting the space between the said first and second piston members with the said one sump chamber for said master cylinder for displacement of fluid from between the said piston members into the said master cylinder sump chamber, the discharge end of said passage means being disposed a substantial distance above the bottom of the said master cylinder sump chamber to prevent supply of hydraulic fluid from the master cylinder sump chamber into the space between the said piston members when the fluid level in the container is at or below the level of said discharge end, and means forming fluid connecting passage means between the cylinder portion of the said second cylinder ahead of said first piston element and the space between the said piston members to provide for fluid flow from the cylinder portion of the second cylinder ahead of said first piston element into said space between said piston members for delivery to said master cylinder sump chamber and depletion of fluid supply in the other of said sump chambers whereby to maintain fluid supply to said first system at the expense of depletion of fluid from said second system thereby to warn the operator of the vehicle of hydraulic fluid loss from the hydraulic system.

5. A hydraulic system for operating the brakes of a vehicle arranged in accordance with the structure set forth in claim 3 wherein the pasage means from the said auxiliary cylinder for displacement of fluid from the auxiliary cylinder into the sump chamber for the said master cylinder also provides a passage means for supplying the said second hydraulic cylinder with hydraulic fluid from the main fluid supply in the storage container so long as the liquid level in the storage container is above the said predetermined low level.

6. A hydraulic system for operating the brakes of a vehicle and a second hydraulic system for operating a second component of the vehicle constructed and arranged in accordance with the structure set forth in claim 4 wherein the cylinder portion of the said second cylinder in which the said second piston operates is of larger diameter than the cylinder portion of the second cylinder in which the first piston element operates.

References Cited in the file of this patent

UNITED STATES PATENTS

| | | |
|---|---|---|
| 2,018,023 | Kliesrath | Oct. 22, 1935 |
| 2,131,459 | Weatherhead | Sept. 27, 1938 |
| 2,141,358 | Meeks | Dec. 27, 1938 |